United States Patent [19]

Chan

[11] Patent Number: 5,244,084

[45] Date of Patent: Sep. 14, 1993

[54] LASER DISK CARRYING CASE

[76] Inventor: Chin-Chung Chan, 4F, No. 131-18, Sec. 2, Chi-Lung Rd., Taipei, Taiwan

[21] Appl. No.: 15,441

[22] Filed: Feb. 9, 1993

[51] Int. Cl.[5] .................... A47B 81/06; B65D 85/30
[52] U.S. Cl. ................................. 206/309; 206/313; 220/336; 312/9.42; 312/9.58
[58] Field of Search ............... 206/444, 307, 309, 310, 206/311, 312, 313; 220/521, 522, 337, 338, 343, 336, 212; 312/9.41, 9.42, 9.44, 9.58, 9.59

[56] References Cited

U.S. PATENT DOCUMENTS 4,875,743 10/1989 Gelardi et al. .................. 312/9.42
5,011,010 4/1991 Francis et al. .................. 206/313 X
5,099,995 3/1992 Karakane et al. .............. 312/9.58 X Primary Examiner—Steven N. Meyers
Assistant Examiner—Jacob K. Ackun, Jr.

[57] ABSTRACT

Disclosed is a laser disk carrying case including two outer shells connected together to hold a disk holder, which can be conveniently turned out of the shells for storing an individual laser disk or retrieving it from the case, and then turned into the shells and locked in place. A wedge block is made on one shell, which is engaged into an opening on the base of the disk holder to lock it inside the shells. The disk holder has spring pawls on a center hole thereof to hold a laser disk on a circular mat thereof.

2 Claims, 5 Drawing Sheets

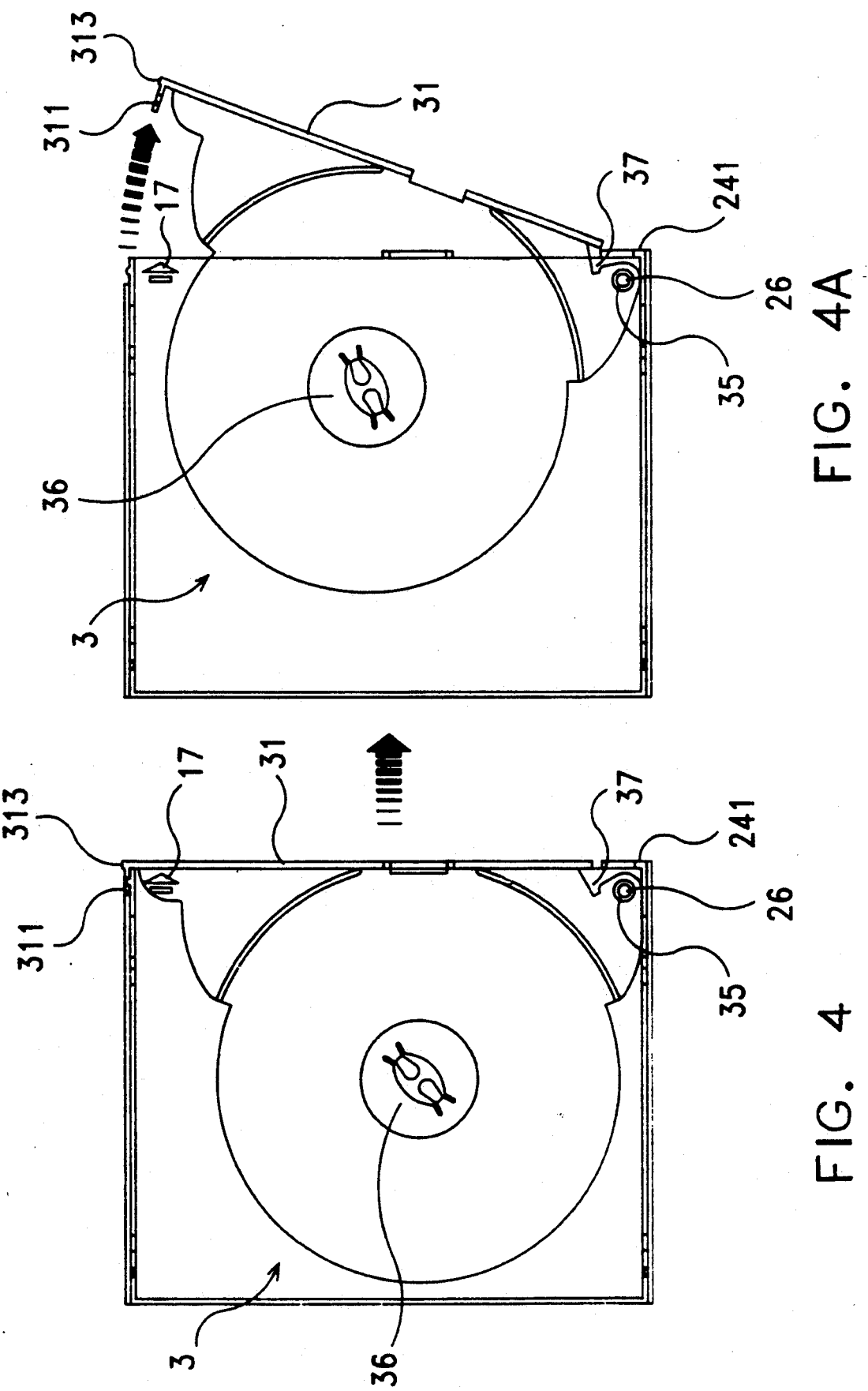

5,244,084

LASER DISK CARRYING CASE

BACKGROUND OF THE INVENTION

The present invention relates to a laser disk carrying case for carrying a laser disk which comprises a housing formed of two symmetrical shells, and a disk holder pivoted to one shell and turned in or out of the shells for storing a laser disk or retrieving it from the case.

Various laser disk carrying cases have been proposed for carrying individual laser disks, and have been appeared on the market. These laser disk carrying cases are commonly comprised of a cover shell hinged to a bottom shell and locked by lock means. When opening the cover shell, one may have to try several times to find the correct direction. Another disadvantage of the prior art laser disk carrying cases is that the cover shell may get stuck easily, and one shell have to apply more labor in opening the case. Further, the individual laser disk may fall out of place as the cover shell is opened.

SUMMARY OF THE INVENTION

The present invention eliminates the aforesaid disadvantages. It is therefore an object of the present invention to provide a laser disk carrying case which is simple in structure and durable in use. It is another object of the present invention to provide a laser disk carrying case which is inexpensive to manufacture and easy to assemble. It is still another object of the present invention to provide a laser disk carrying case which is easy to open. It is still another object of the present invention to provide a laser disk carrying case which can hold a laser disk firmly in place when opened.

According to the preferred embodiment of the present invention, the laser disk carrying case is generally comprised of two outer shells connected together to hold a disk holder, which can be turned out of the shells for storing or retrieving an individual laser disk, and then turned into the shells and locked in place by a wedge block on one shell. The shells are connected by hooking the hooks of a first shell on the respective retaining slots on the other shell and engaging the raised portions on the first shell into the respective round holes on the second shell. The disk holder has spring pawls on the center of a circular mat thereof for holding an individual laser disk in place, and a finger strip for moving with the hand.

BRIEF DESCRIPTION OF THE DRAWINGS

FIGS. 4 and 4A illustrate the procedure in opening the laser disk carrying case.

DETAILED DESCRIPTION OF THE PREFERRED EMBODIMENT

Figure 1:
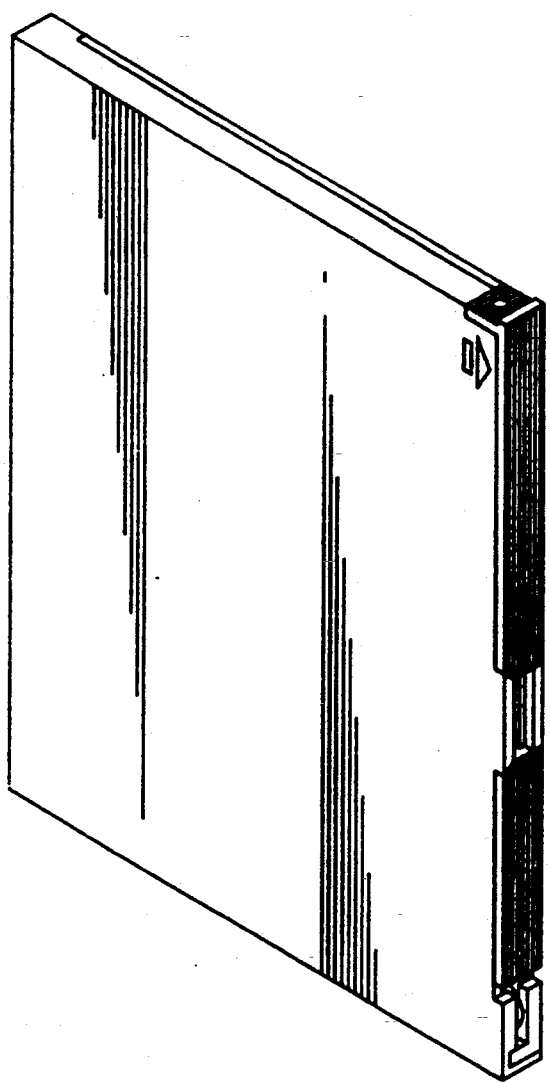
FIG. 1 is an elevational view of a laser disk carrying case according to the present invention.

Referring to FIG. 1, a laser disk carrying case in accordance with the present invention is made in the shape of a flat, rectangular container.

Figure 2:
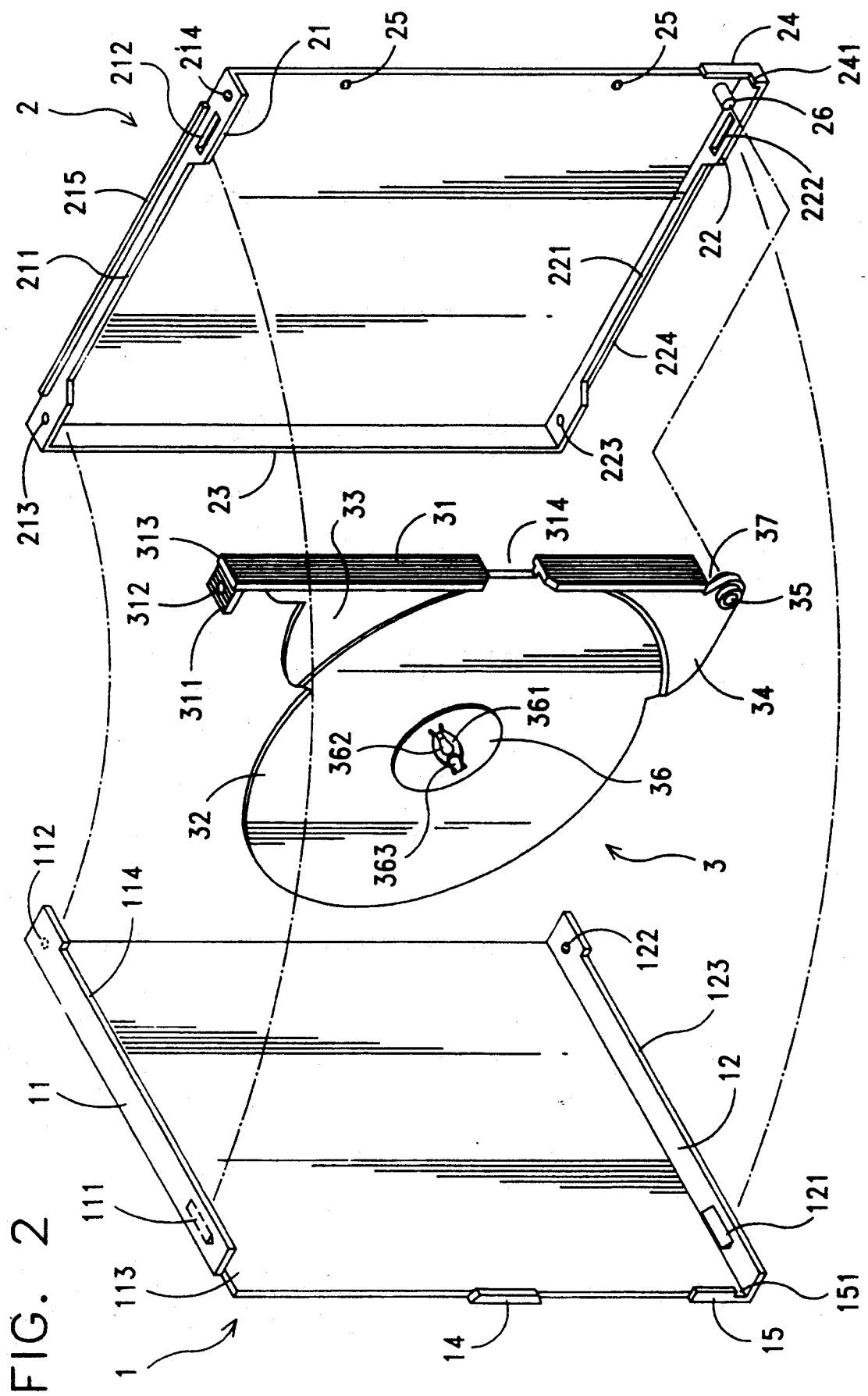
FIG. 2 is an exploded view thereof.

Referring to FIG. 2, the laser disk case is generally comprised of a first shell 1, a second shell 2, and a protective disk holder 3. The first shell 1 is made from a flat rectangular plate having two vertical side walls 11,12 raised from two opposite sides thereof in the same direction, a center wedge block 14 and a lateral projecting plate 15 respectively raised from a third side thereof. One vertical side wall, namely, the left vertical side wall 11 has a front end cut off, and therefore a gap 113 is formed. The left vertical side wall 11 comprises a hook 111 and a small raised portion 112 on the inside at two opposite ends, and an elongated recessed portion 114 on its top edge. The other vertical side wall, namely the right vertical side wall 12 comprises a hook 121 and a small raised portion 122 on the inside at two opposite ends, and an elongated recessed portion 123 on its top edge. The lateral projecting plate 15 is spaced from the right vertical side wall 12 by a gap 151.

The second shell 2 is made from a flat rectangular plate having three vertical side walls, namely, the left vertical side wall 21, right vertical side wall 22 and rear vertical side wall 23 respectively raised from three contiguous sides thereof in the same direction and connected into a continuous peripheral wall, two small raised portions 25 spaced on the inside along the border between the left and right vertical side walls 21,22, and angle block 24,241 raised from the other side thereof and connected to the right vertical side wall 22, and a pin 26 on the inside adjacent to the angle block 24,241 and the right vertical side wall 22. The left vertical side wall 21 comprises a recessed portion 211 on its top edge, an outer small raised portion 214 at a location corresponding to the gap 113 on the left vertical side wall 11 of the first shell 1, a retaining slot 212 and a small round hole 213 at locations corresponding to the hook 111 and raised portion 112 on the left vertical side wall 11 of the first shell 1, and an elongated outside rail 215 in size and at location corresponding to the recessed portion 114 on the left vertical side wall 11 of the first shell 1. The right vertical side wall 22 comprises a recessed portion 221 on its top edge, a retaining slot 222 and a small round hole 223 at locations corresponding to the hook 121 and raised portion 122 on the right vertical side wall 12 of the first shell 1, and an elongated outside rail 224 in size and at location corresponding to the recessed portion 123 on the right vertical side wall 12 of the first shell 1. The recessed portions 211,221 on the left and right vertical side walls 21,22 of the second shell 2 are simply to reduce the material cost.

The protective disk holder 3 comprises a circular mat 32 perpendicularly connected to an elongated base plate 31 by connecting strips 33, 34. The elongated base plate 31 comprises an opening 314 at a location corresponding to the center wedge block 14 of the first shell 1, a finger strip 313 on one end, a projecting plate 311 perpendicularly extended inwards from the finger strip 313, and a small round hole 312 on the projecting plate 311, into which the raised portion 214 may be engaged. One connecting strip 34 has an axle hole 35 adjacent to a bottom notch 37 thereof. The outside surface of the elongated base plate 31 may be embossed with decorative stripes. The circular mat 32 is made to hold an individual laser disk, having a laser disk retainer 36 at the center, which has two symmetrical spring pawls 362, 363 on an elongated center hole 361 thereof.

The assembly process of the laser disk carrying case is simple and outlined hereinafter. The protective disk holder 3 is connected to the second shell 2 by inserting the pin 26 into the axle hole 35. The first shell 1 is then connected to the second shell 2 by: fitting the angle block 24,241 into the gap 151, then hooking the hooks 111, 121 on the retaining slots 212,222 respectively and engaging the raised portions 112,122 into the round holes 213,223, and then fitting the projecting plate 311 into the gap 113 for permitting the raised portion 214 to be engaged into the round hole 312. When assembled, the projecting plate 311 covers over the left vertical side wall 21 of the second shell 2, and the finger strip 313 is extended outwards for moving with the hand. FIG. 1 illustrates the laser disk carrying case assembled and closed up.

Figure 3A:
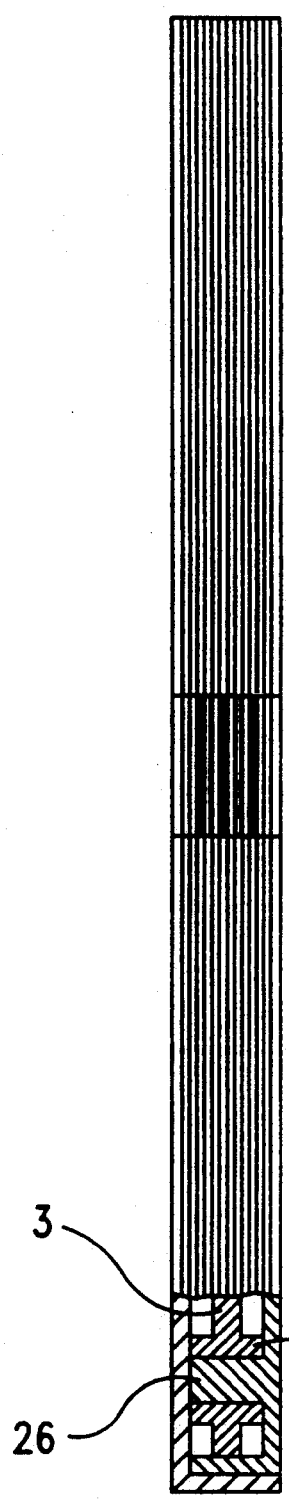
FIGS. 3A and 3B are longitudinal sectional views taken from different sides.
Figure 3B:
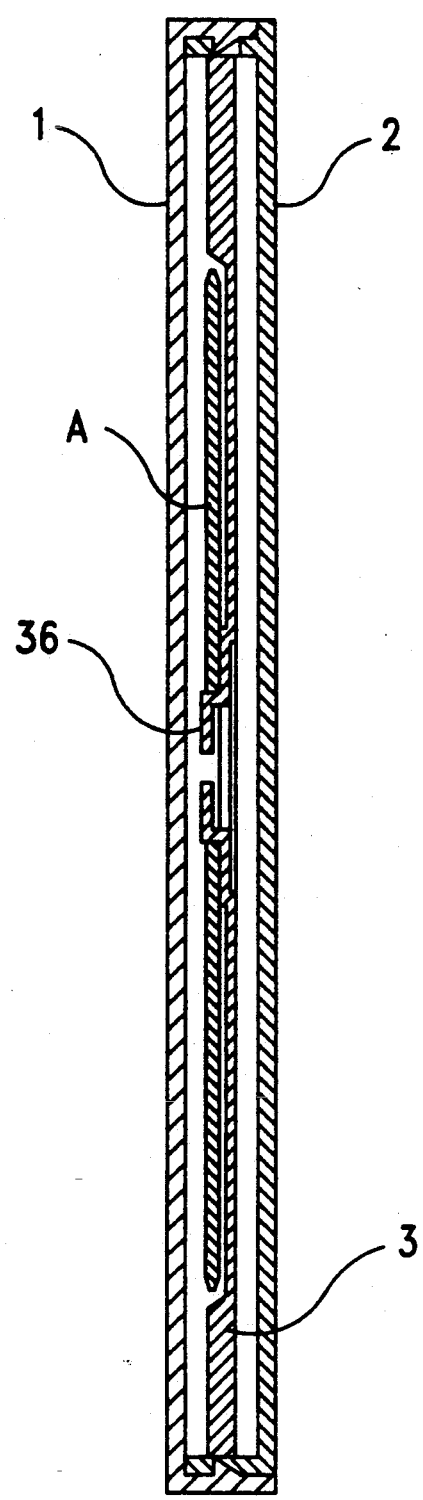

Referring to FIGS. 3A and 3B, the first shell 1 is covered on the second shell 2 with the protective disk holder 3 retained on the inside. By means of the spring pawls 36, a laser disk A is retained to the circular mat 32 of the protective disk holder 3 and held inside the first and second shells 1,2.

Figure 5:
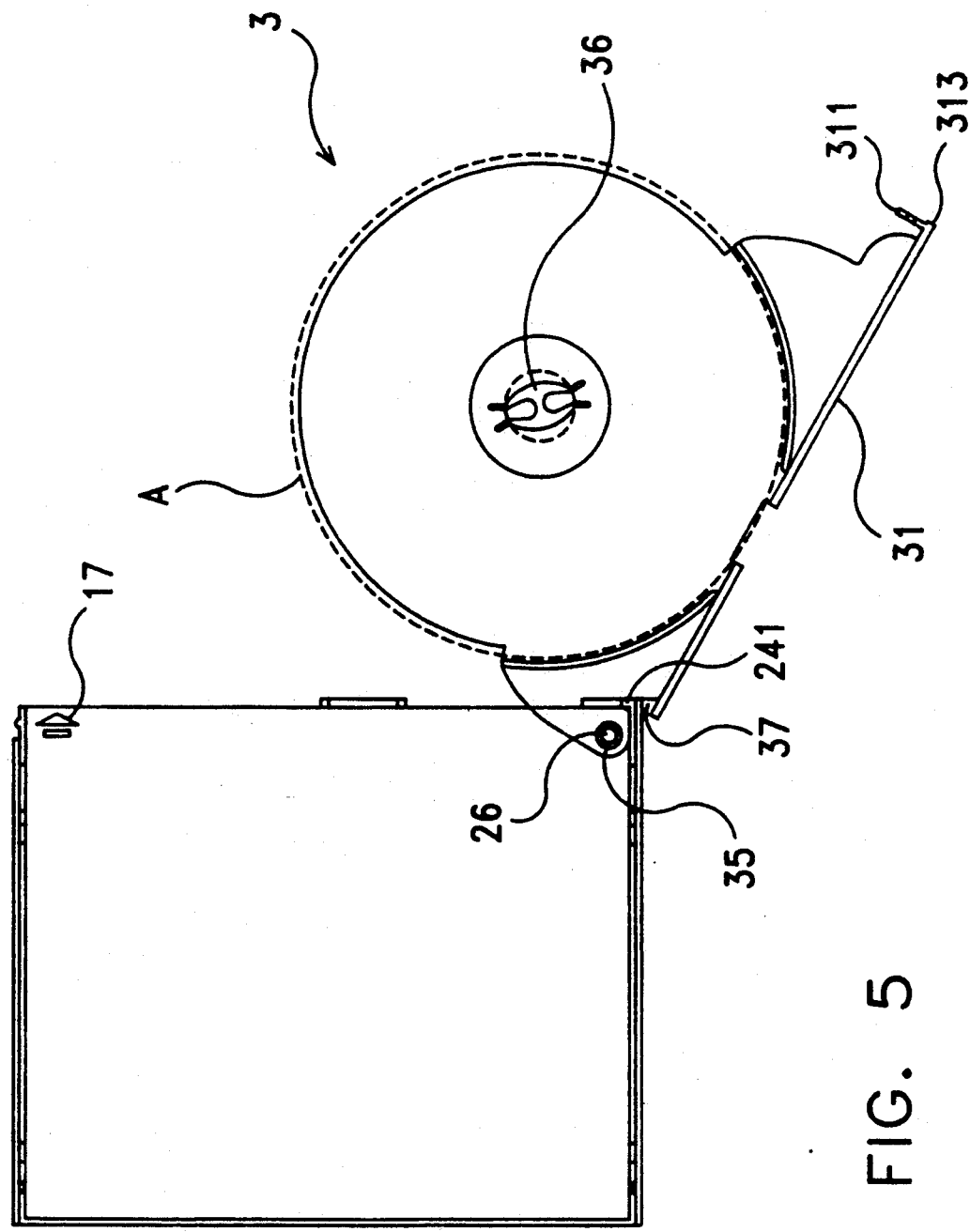
FIG. 5 shows the laser disk carrying case completely opened.

Referring to FIGS. 4 and 5, pulling the finger strip 313 of the base plate 31 of the protective disk holder 3 outwards causes rotation of the protective disk holder 3 on the pin 26, and therefore the protective disk holder 3 can be turned out of the shells 1,2. As the circular mat 32 of the protective disk holder 3 has been completely moved out of the shells 1,2, the angle block 24,241 is automatically engaged into the bottom notch 37 of the connecting strip 34 to stop the protective disk holder 3 in position, and therefore the laser disk A can be conveniently removed from the protective disk holder 3. Further, a directional mark 17 is made on the first shell 1 adjacent to the finger strip 313 of the base plate 31 of the protective disk holder 3 to indicate the direction in opening the protective disk holder 3.

What is claimed is:

1. A laser disk carrying case comprising:

a first shell made from a flat rectangular plate having a left vertical side wall and a right vertical side wall respectively raised from two opposite sides thereof in the same direction, a center wedge block and a lateral projecting plate respectively raised from a third side thereof, the left vertical side wall comprising a front gap at one end, a hook and a small raised portion on an inside at two opposite ends, and an elongated recessed portion on a top edge thereof, the right vertical side wall comprising a hook and a small raised portion on an inner side at two opposite ends, and an elongated recessed portion on a top edge thereof, said lateral projecting plate being spaced from the right vertical side wall by a gap;

a second shell made from a flat rectangular plate having a left vertical side wall, a right vertical side wall and a rear vertical side wall respectively raised from three contiguous sides thereof in the same direction and connected into a continuous peripheral wall, an angle block raised from the other side thereof and connected to its right vertical side wall, and a pin on the inside adjacent to said angle block, the left vertical side wall of said second shell comprising an outer small raised portion at a location corresponding to the front gap on said left vertical side wall of the first shell, a retaining slot, on which the hook of the left vertical side wall of said first shell hooks, a small round hole, into which the raised portion on the left vertical side wall of said first shell engages, and an elongated outside rail fitted into the recessed portion on the left vertical side wall of said first shell, the right vertical side wall of said second shell comprising, a retaining slot, on which the hook of the right vertical side wall of said first shell hooks, a small round hole, into which the raised portion on the right vertical side wall of said first shell engages, and an elongated outside rail fitted into the recessed portion on the right vertical side wall of said first shell; and a protective disk holder connected to said second shell and turned inside the holding space defined within said first and second shells or out of said first and second shells for storing of a laser disk or retrieving it, said protective disk holder comprising a circular mat perpendicularly connected to an elongated base plate by connecting strips, said base plate comprising an opening, into which said wedge block of said first shell is inserted to lock said protective disk holder inside said first and second shells, an outer surface embossed with decorative stripes, a finger strip at one end extended out of said second shell, a projecting plate perpendicularly extended inwards from said finger strip, an axle hole at an opposite end, into which said pin of said second shell inserts, and a notch adjacent to the axle hole, into which said angle block of said second shell is engaged to stop said protective disk holder in an open position out of said first and second shells, said finger strip having a small round hole on an outer side, into which the raised portion on the left vertical side wall of said second shell engages, said circular mat having a laser disk retainer at the center, said laser disk retainer comprising two symmetrical spring pawls on an elongated center hole for holding a laser disk.

2. The laser disk carrying case of claim 1 wherein said first shell is marked with a directional mark adjacent to said finger strip to indicate the direction in turning said protective disk holder out of said first and second shells.

* * * * *